US010131050B1

(12) United States Patent
Cattaneo

(10) Patent No.: US 10,131,050 B1
(45) Date of Patent: Nov. 20, 2018

(54) ROTARY TOOL WORKBENCH CRADLE

(71) Applicant: Stephen Cattaneo, Dublin, OH (US)

(72) Inventor: Stephen Cattaneo, Dublin, OH (US)

( * ) Notice: Subject to any disclaimer, the term of this patent is extended or adjusted under 35 U.S.C. 154(b) by 0 days.

(21) Appl. No.: 15/661,603

(22) Filed: Jul. 27, 2017

(51) Int. Cl.
*F16M 11/00* (2006.01)
*B25H 1/00* (2006.01)
*B24B 23/00* (2006.01)

(52) U.S. Cl.
CPC ........... *B25H 1/005* (2013.01); *B24B 23/005* (2013.01)

(58) Field of Classification Search
USPC .......................................................... 248/671
See application file for complete search history.

(56) References Cited

U.S. PATENT DOCUMENTS 1,860,071 A * 5/1932 Bodkin .................. B25H 1/005 144/1.1
4,085,552 A * 4/1978 Horine ..................... B23Q 9/00 451/340
4,159,821 A * 7/1979 Hickman ............. B23D 59/007 269/139
4,314,782 A * 2/1982 Beekenkamp ......... B25H 1/005 408/110
4,405,003 A * 9/1983 Watson ................ B25H 1/0042 144/286.1
4,873,777 A * 10/1989 Southard .............. A47B 81/005 211/64
4,919,408 A * 4/1990 Muir .................... B25H 1/0007 269/296
5,058,302 A * 10/1991 Minneman .............. F41A 23/18 206/315.11
5,626,321 A * 5/1997 Ulshafer, Jr. .......... B25H 1/005 182/181.1
5,647,420 A * 7/1997 Michell ................ B23D 59/007 144/253.1
5,722,473 A * 3/1998 Tucker ................ B23D 47/025 144/286.1
5,863,160 A * 1/1999 Havener ................ B25H 1/005 408/103
6,131,626 A * 10/2000 Raill ...................... B25H 1/005 144/135.2
6,637,738 B1 * 10/2003 Beaudet ................ B25B 1/2457 269/271

(Continued)

*Primary Examiner* — Monica E Millner
(74) *Attorney, Agent, or Firm* — Juneau & Mitchell; Todd L. Juneau

(57) ABSTRACT

The rotary tool workbench cradle embodiment is a structural configuration that uniquely provides dual panel support to the collar and the housing of the rotary tool, utilizing a V-notched, slidable and ratcheted back panel to incrementally elevate the housing of the rotary tool for horizontal positioning. Accessories mounted in the collet of the rotary tool are aligned parallel to the workbench or table top providing a more effective means for a horizontal placement of the cutting tool surface to be sharpened. The parallel alignment of the grinding surface of the rotary tool accessory and the workbench surface to which a tool to be sharpened (chisel, knife, scissors) can be held or mounted, provides for sharpening with more precision. Moreover, the device facilitates the horizontal seating of the rotary tool for the young and for amateurs. Both hands are freed to more safely and effectively secure the workpiece.

5 Claims, 6 Drawing Sheets

(56) References Cited

U.S. PATENT DOCUMENTS

| | | | | |
|---|---|---|---|---|
| 6,860,682 | B1 * | 3/2005 | Le Picq | B25H 1/0078 408/112 |
| 7,124,992 | B1 * | 10/2006 | Colledge | B25H 1/005 248/346.07 |
| D595,102 | S * | 6/2009 | Francis | D8/74 |
| 9,322,504 | B2 * | 4/2016 | Davi | F16M 11/046 |
| 9,682,470 | B2 * | 6/2017 | Helm | B25H 1/04 |
| 2009/0045088 | A1 * | 2/2009 | McCray | B25F 5/029 206/349 |
| 2014/0239568 | A1 * | 8/2014 | Masuya | B23Q 1/26 269/57 |

* cited by examiner

ROTARY TOOL WORKBENCH CRADLE

BACKGROUND

Field of the Invention

Rotary power tools have been used for decades in industry and by professionals toward the task of cutting, drilling, shaping and securing a workpiece in predetermined configurations in mass production format. In more recent years refined, lighter, hand held devices have been developed to enhance utilization by individuals in many industrial applications including construction and woodworking. To enhance the individual carpenter, the jeweler, the professional and amateur craftsman, the homeowner and the child toward his or her arts and craft activities. The rotary tool provides for cutting, sanding, grinding, polishing, drilling and engraving of fixed and hand-held workpieces.

The portable, hand-held rotary tool, exemplified by the DREMEL rotary tool, typically consists of a small, universal electric motor unit mounted within a plastic protective housing. The motor, actuated by an on-off switch, provides one or more variable speeds to a drive shaft which projects out to a collet and collet nut or chuck assembly. The shafts of the rotary tool accessories (grinding wheels, abrasive wheels, carbide cutters, disc sanders, wire polishing brushes) are inserted and secured within the collet or chuck.

The rotary tools, provided by numerous manufacturers (DREMEL, Black and Decker, DeWALT, Milwaukee, WEN, Proxxon, Ryobi, Craftsman), vary in shape, size and weight. The housing or body of the rotary tools are ergonomically configured for a firm hand grip or, on the lighter, smaller devices, for a Pen grip using the thumb and index finger. The rotary tools are generally 15 to 25 cm in length. The diameter at the mid portion of the housing is generally 49 to 53 mm with the neck or housing cap at the chuck end of the tool generally 18 to 24 mm in diameter. The rotary tools are generally 1.5 lbs or less in weight.

In addition to the light weight, small size and multiple accessories available for sanding, drilling, cutting, engraving, routing and polishing, a basic and unique feature of the rotary tool is the high speed provided to the accessory. Variable speeds ranging from 5,000 to 35,000 revolutions per minute are provided at low torque. This is in contrast to the electric drill which runs at low speed, less than 3000 rpm, with high torque. Moreover, there is no on-off switch to the electric drill which would allow it to run on its own. With the rotary tool the accessory can be set to run on its own at a preset speed, freeing up both hands for the material (workpiece) to be securely held and cut. The higher speeds permit cutting of hardwoods, steel and the engraving of glass.

The unique features of the hand-held rotary tool are described in some detail above as a prelude to the conceived need to horizontally secure rotary tools of various sizes and shapes to enhance individual performance and safety for the amateur craftsman, homeowner and child using these devices. Instruction manuals have emphasized the need for precaution when holding the rotary tool, particularly if the workpiece has not been secured to the workbench and excessive pressure has been applied when cutting or etching at high speeds. For example, cutting accessories can grab in the groove and dislodge with loss of control. A second hand to support the hand holding the tool should be used to prevent loss of control of the tool.

A simple rotary tool workbench cradle was conceived initially to assist children participating in arts, crafts and woodworking skills. The Pinewood Derby is an excellent example of this skillset. An annual event sponsored by the Boy Scouts of America provides for the Cub Scout with parental assistance to cut, carve and sand a block of wood to create a derby car of specific weight and dimension. Traditionally, a rotary tool can be utilized to shape the model car. With a rotary tool secured in a vice the child can use both hands to hold the workpiece (his model car) toward the task of holding and positioning the wood block against the rotating sanding drum. The horizontally secured rotating tool clearly enhances child participation. Moreover, the model car wheels are best prepared by polishing all four wheels simultaneously to achieve flat treads with wheels of equal size and weight. This can be done by sanding the wheels, mounted on a mandrel in lathe-like fashion, keeping the mandrel (and wheels) parallel to the workbench with a horizontally positioned sanding block beneath the wheels. The rotating tool is secured on the table top or workbench in horizontal alignment to rotate the mandrel shaft to which the wheels are mounted. Maintaining the horizontal alignment of the rotating tool on the table top or workbench using books or blocks of wood can be time consuming and frustrating. This need further prompted the conception for a rotating tool workbench cradle.

Additional applications for such a device have been advanced for utilization by the amateur craftsman and homeowner. A horizontally fixed and positioned rotating tool with horizontally rotating grinding stones and sanding drums, provides the means to sharpen scissors, knives, chisels and other cutting tools with more precision as the second hand is freed up to further position and secure the workpiece parallel to the workbench and the rotating abrading accessory. Working with metal, plastic or wood craft, the fixed, secured, rotating tool provides for the horizontal, predetermined positioning of cutting, carving, and sanding accessories, permitting the craftsman to utilize both hands to securely and safely position the workpiece.

The jeweler, shaping, encasing, engraving, or polishing an item of jewelry could appreciate a two hand application to unique, irregular, cumbersome workpieces. Better hand control to wire and bristle brushes used to polish silverware and jewelry provides for optimal hand pressure control, to minimize bristle wire fatigue and preserve the life of the polishing brush.

There is a need for a workstation device to position, fix and secure the rotating tool in a horizontal position with an accessory attached to run and perform at a predetermined speed toward the task of grinding, cutting, sanding and polishing of a workpiece more effectively and safely held and secured with both hands. The feature provides an opportunity for the professional, the amateur craftsman, the homeowner and the child to more effectively utilize both hands toward the task. Precision and safety is potentially enhanced.

Moreover, the rotary tool workbench cradle embodiment has been reduced to practice. A prototype has been developed and effectively utilized. The prototype is inexpensive, easy to operate, accommodates many tool shapes and sizes and provides for incremental platform adjustment for precision horizontal alignment of the rotary tool accessory to the workbench. Marketing potential is formidable.

Description of the Prior Art

Hand held power tools, the electric drill, and in more recent years, the rotary tool exemplified by DREMEL are now widely used by professionals, jewelers, amateur craftsman, artists, woodcrafters, homeowners, young adults and children utilizing the numerous accessories now available. The accessories (drill bits, grinding wheels, sanding discs, cutting and routing bits, polishing wheels) are inserted in the collet or chuck of the DREMEL which is hand held and activated with a switch to rotate continuously at variable speeds. This is in contrast to the electric drill and similar construction tools which have a lever on a contoured handle which must be manually compressed and held to activate the tool.

This unique feature of the rotary tool along with the light weight and linear configuration has facilitated the manufacture of numerous rotary tool holding devices, principally to vertically mount the rotary tool to function as a portable drill press. Mechanisms for the horizontal mounting of a rotary tool have been traditionally with the use of a vise or drill stand configurations which provide for a 90 degree rotation of the rotary tool support strap or holder. Alternative devises such as the Universal clamp holder, DREMEL 360 degree rotatable holder, ZFE clamp holder and the DRELD holder have annular O-ring jaws that are secured around the neck of the rotary tool which can then be rotated 360 degrees. A horizontal position of the rotary toll is possible and maintained with the single support of the O-ring. This type of bench vise is secured to the edge of the work bench with a clamping mechanism.

The Wilton bench vise represents the traditional steel vise with two jaws on a swivel base which mounts to the top of a workbench. A handle is rotated to move the outer jaw which is mounted to a horizontal sliding steel column closing the outer jaw to clamp on the workpiece.

U.S. Pat. No. 8,517,366 to Seber discloses a bench vise, known in the art as a common mechanism for holding workpieces between two jaws. The workpiece or rotary tool is positioned between two jaws, one of which is movable on a threaded workshaft by rotating a handle attached to the treaded shaft. Soft, conforming materials are added to the jaw surfaces both to protect the plastic housing of the rotary tool and to further secure and fix the rounded housing of an activated rotary tool, steadfastly in a horizontal position. This can be difficult to achieve and maintain.

U.S. Pat. No. 8,534,655 to Hovarter addresses two types or traditionally employed vises for gripping workpieces, a face vise which is placed or mounted on the top of a work bench and a tail vise which is mounted to the end of the bench. A twin screw tail vise is disclosed with a clamp shaft passing through and to better support the rounded housing of many rotary tools. A secure positioning and fixing of the activated rotary tool may be difficult to achieve aligned holes in a pair of opposing jaws which when rotated actuates a bridge which moves the clamp shaft to affect clamping of a workpiece (or rotary tool) between the jaws. The quick action woodworking vise is complex and additional support to a rounded rotary tool housing is necessary to secure and support the rotary tool in a horizontal position.

The Proxxon 28600 Micromot drill stand holds the Proxxon rotary tools in a vertical configuration for workpiecedrilling. The mechanism has dovetail guides which can be tilted through 90 degrees to position the rotary tool horizontally with a single support to this position of the rotary tool at the neck or collar near the chuck. The Micromot utilizes Proxxon rotary tools.

The DREMEL 220-01 Rotary tool workstation—drill press work station is compatible with DREMEL rotary power tools. The work station has a cup-like tool holder which is mounted perpendicular to the vertical post into which the neck of the rotary tool is screwed to hold the rotary tool in a vertical position. The mechanism provides for the 90 degree rotation of the tool holder to achieve the horizontal position for polishing and sanding. There is a single support to the rotary tool and the station may not be compatible with the many rotary tools available through other manufacturers.

U.S. Pat. No. 2,477,916 to Wilhide relates to a bench drill stand for holding and clamping a portable power drill for use as a drill press. The mechanism to hold the portable drill is comprised of a carriage with forked prong members at the bottom of the carriage and a set screw with a lock nut to secure the drill vertically between the set screw and the forked member. The carriage and drill move only in a vertical direction toward the task of drilling.

U.S. Pat. No. 3,853,420 discloses a portable electric drill accessory comprised of a base with vertical pole to which a yolk, slidable on the post, carries a flexible steel clamping band acting as a hoop which can be tightened around an electric hand drill to hold the drill in position. Aside from the single band at the center of the drill housing there is no additional support to secure the drill in the horizontal position.

U.S. Pat. No. 6,223,794 to Jones describes a wood working station designed to hold small bodied rotary tools for cutting and routing. One configuration provides a U-shaped brace with a set screw to tighten and hold a small rotary tool in a vertical position. Movement toward the workpiece is provided by an electric powered extension member which moves up and down the tower. The mechanism is complex and does not provide for horizontal tasking.

U.S. Pat. No. 20090045088 to Mccray discloses a rotary tool charging station which includes an electric tool holder, a charging port with a first coupling station and an accessory pod to hold a plurality of accessories. The rotary tool holder is a semicircular collar with a cup-like configuration at the bottom designed to receive the lower portion or handle of the rotary tool, holding the tool in an upright position for charging. The device is complex and includes a second coupling station along with a pod to hold accessories.

The various prior art mechanisms to hold and position the rotary tools vary from the traditional bench vise to complex configurations to support and move the rotary tool for routing, cutting and drill press application. The devices are generally made of ferrous metals or aluminum alloy. The Wilton jaw vise will not consistently hold the round housing of the rotary tool given the concern for excessive pressure to the plastic housing and the potential occlusion of ventilation openings. Generally, for the portable drill press application, rotary tool holder support is generally a single support at the neck or collar of the tool. Moreover, an incremental adjustment mechanism to more precisely level the rotary tool in the horizontal position utilizing a second mid tool support is not provided.

The horizontal holding and positioning of the rotary tool is essential to providing a horizontal configuration of the rotating accessories that are inserted into the collet or chuck of the rotating tool. The rotary tool workbench cradle satisfies a need to provide a mechanism to horizontally insert a variety of rotary tools with different configurations, from multiple manufacturers in a dual support system to the front and back of the rotary tool. The rotary tool is held securely in the horizontal position with a mechanism to incrementally elevate a second support system for more precise leveling of the rotating accessories. The unit, generally of plastic, is cost effective, has performed effectively in prototype format and easy as well for the amateur craftsman, young adult or the child to utilize. With the rotary tool horizontal in the cradle both hands are free to securely hold, position and rotate the workpiece.

The advantages over prior art for one or more aspects of the embodiment will become apparent from a consideration of the ensuing description and accompanying diagrams.

SUMMARY

The rotary tool workbench cradle was designed to position rotary tools and accessories from multiple manufacturers in the horizontal position, with ease and precision. In this embodiment both hands are free to secure the workpiece toward the task of cutting, grinding, sanding and polishing with the tool accessories rotating at preset speeds horizontal to the table top or workbench. The device is characterized by a front support panel to the collar of the rotary tool and a ratcheted back support panel which can be incrementally elevated to level the rotary tool and the accessories which are mounted in the collet or chuck. The cradle is further characterized by a slidable U-shaped housing which houses the ratcheted back support panel which can be moved along the cradle platform to be compatible with the various rotary tool sizes and shapes available through multiple manufacturers.

The rotary tool workbench cradle is safe for use by the amateur craftsman and child in his or her woodcraft activities, permitting two hand support to the workpiece. For the professional or homeowner it can function as a grindstone, utilizing the workbench surface now in parallel support to stabilize the cutting surface of the tool (chisels, knives, scissors, mower blades, hedging shears and other cutting tools) to be sharpened by the grinding stone or grinding wheel in a plane horizontal to the grinding surface. Both hands are free to stabilize the tool to be sharpened. The cradle is lightweight, portable and facilitates direct, horizontal insertion of the rotary tool on two supporting panels.

DESCRIPTION OF PREFERRED EMBODIMENT

The features, aspects and advantages of the present invention will become better understood with reference to the following description, examples, and claims.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
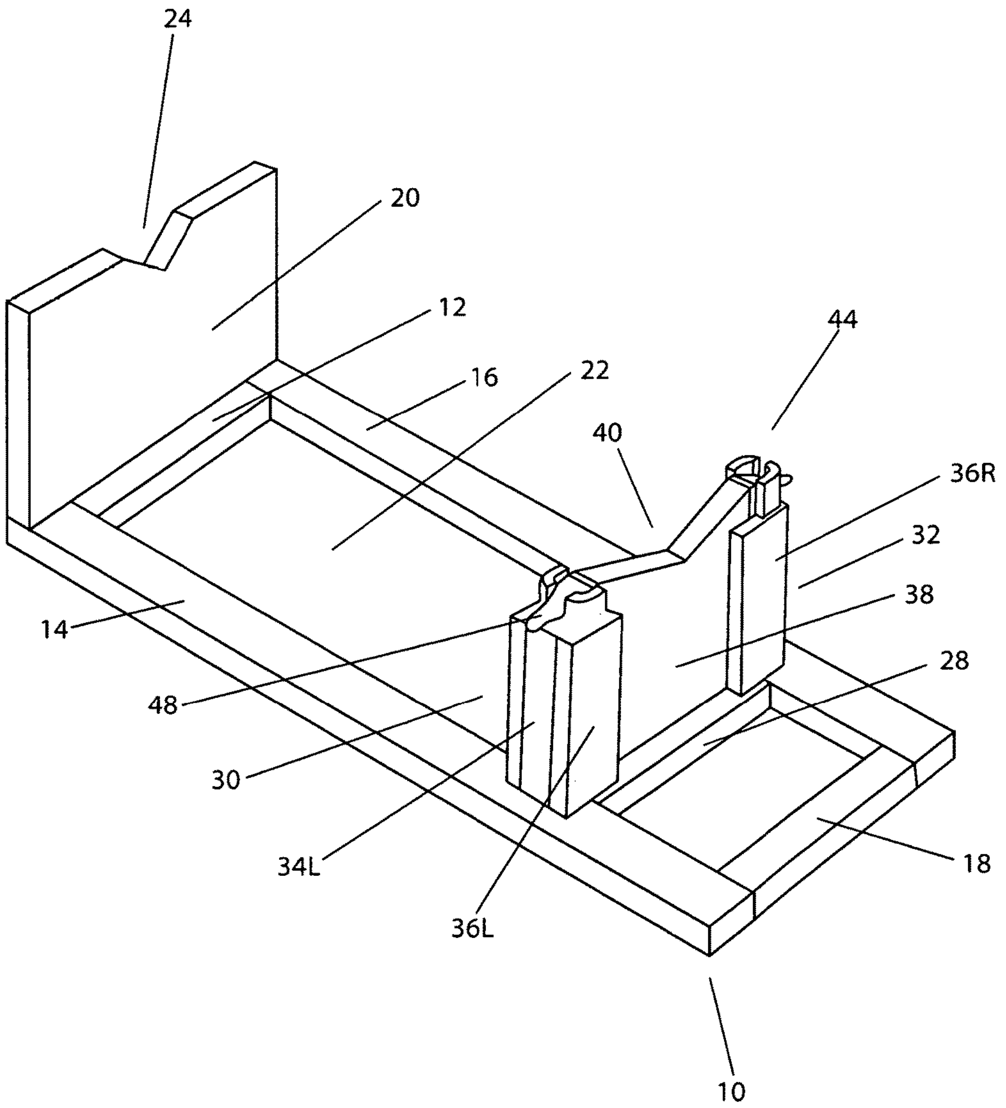
FIG. 1 shows an overall frontal perspective view of a presently preferred embodiment of a rotary tool workbench cradle.

FIG. 1 shows an overall frontal perspective view of a presently preferred embodiment of a rotary tool workbench cradle. The device is a workstation which provides horizontal, dual panel support to a rotary tool.

Figure 2:
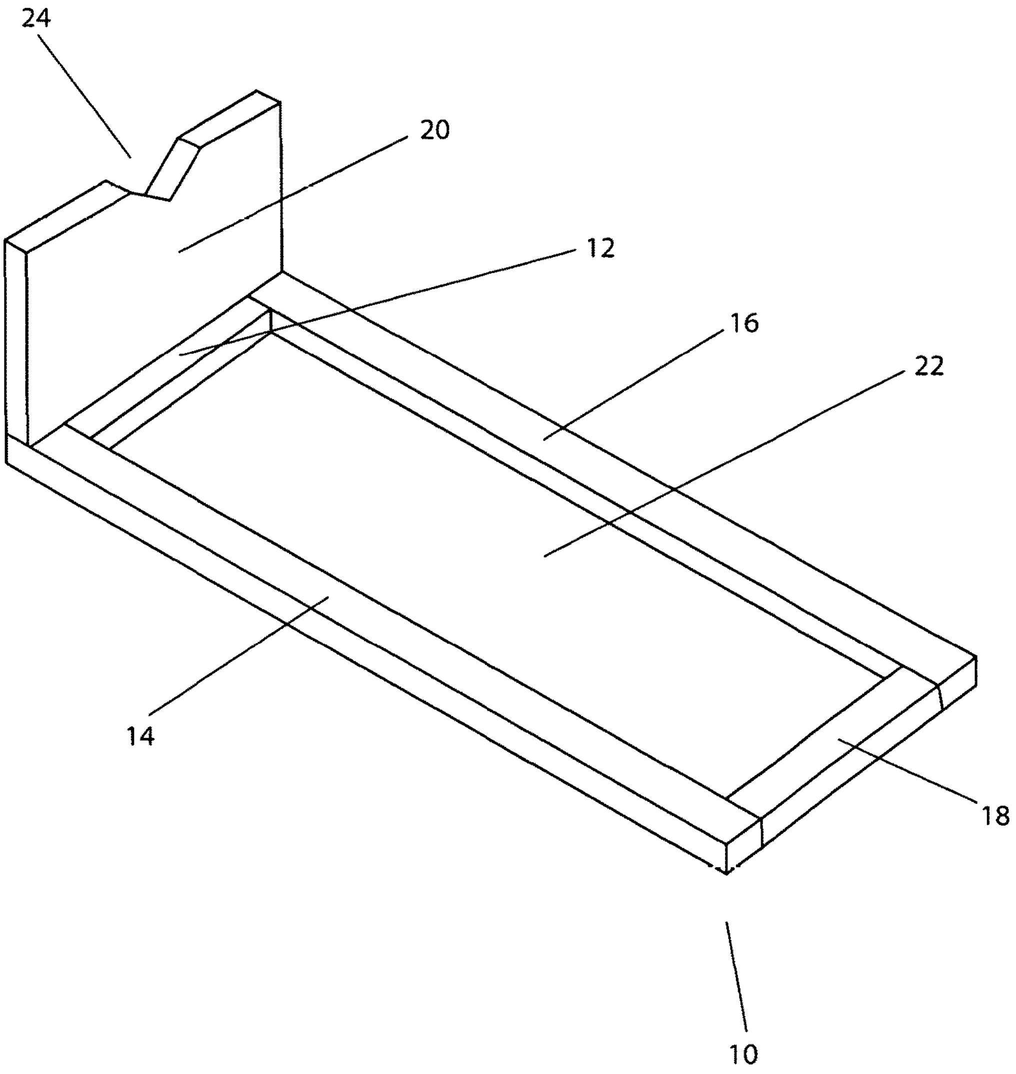
FIG. 2 shows a perspective view of the rectangular base platform with the rotating tool front support panel mounted at the top front of the open rectangular base.

Shown in FIG. 2 is the rectangular base platform 10 with a rotary tool front support panel 20 mounted on a forward base member 12 perpendicular to the rectangular base platform 10. The rectangular base platform consists of four base members anchored in a linear plane to form a rectangular base platform 10 leaving a central rectangular space 22. The forward base member 12 and the rear base member 18 are of rectangular shape, generally 8 mm in thickness, 20 mm in width and 73 mm in length. The right base member 14 and the left base member 16 are of rectangular shape, generally 8 mm in thickness, 20 mm in width and 18 cm in length.

The rotating tool front support panel 20 is rectangular in shape, general 8 mm in thickness, 113 mm in width and 6 cm in height with the top edge comprised of a central notch 24 in a V configuration of predetermined width and depth.

Figure 3:
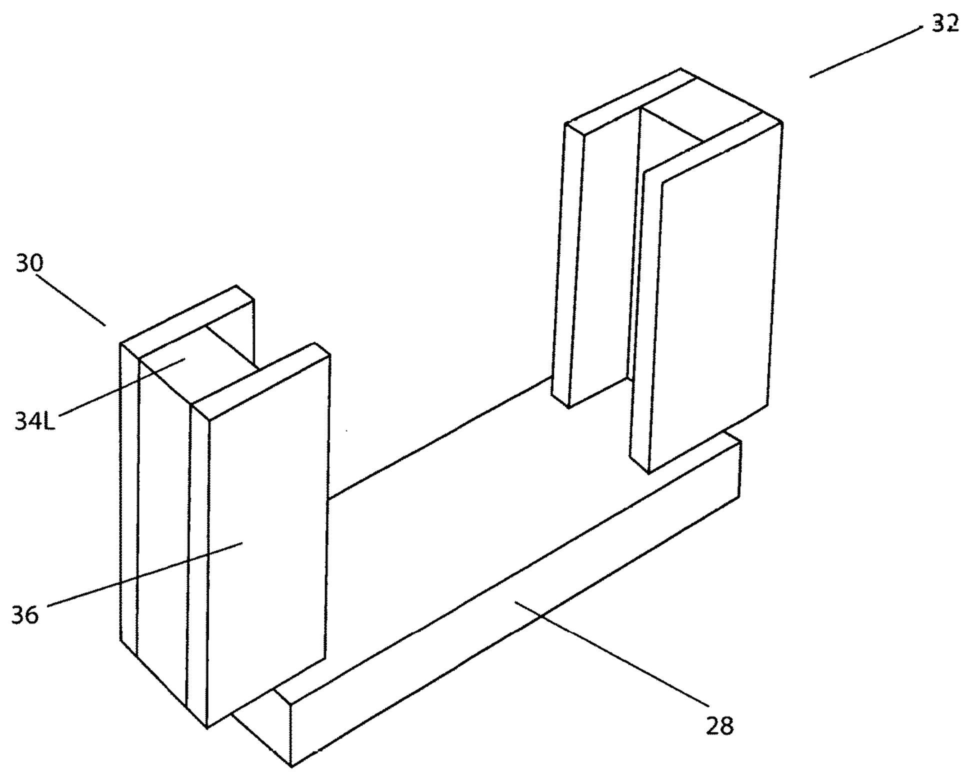
FIG. 3 is an enlarged, perspective view of the slidable U-shaped support housing with the slidable central base strut.

FIG. 3 demonstrates a slidable U-shaped housing 26 of predetermined size, consisting of a rectangular, slidable central base strut 28, a right slotted column 30 and a left slotted column 32. The slidable central base strut 28 is generally 8 mm in thickness. 20 mm in width and 73 mm in length which is slidable in the central rectangular space 22 of the rectangular base platform 10 perpendicular to the right base member 14 and the left base member 16. The right slotted column 30 and the left sided column 32 are of similar configuration, comprised of a central post 34 generally 8 mm in thickness, 8 mm in width and 45 mm in height. A side panel 36, generally 2 mm in thickness, 15 mm in width and 45 mm in height is mounted along the length of both sides of the central post 34 to form the U-shaped configuration of the right slotted column 30 and the left slotted column 32.

The right slotted column 30 and the left slotted column 32 are similarly, perpendicularly mounted, one at each end of the slidable central base strut 28 with the U-shaped configuration of the right slotted column 30 and the left slotted column 32 facing the central rectangular space 22.

Figure 4:
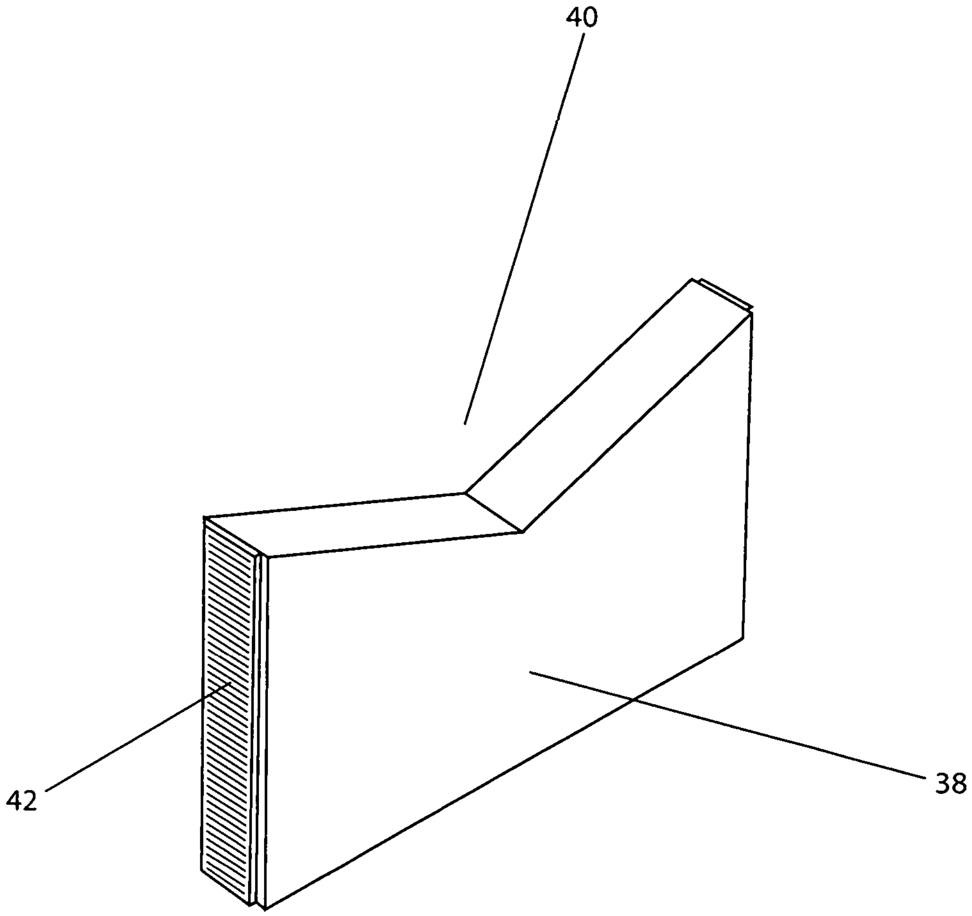
FIG. 4 is an enlarged, perspective view of the rotary tool ratcheted back support panel.

FIG. 4 depicts the rotary tool ratcheted back support panel 38, generally 8 mm in thickness, 7 cm in width and 45 mm in height with the top edge comprised of a central panel notch 40 in V-configuration of predetermined width and depth. A cable tie band 42, generally 1.5 mm in thickness, 8 mm in width and 45 mm in height is mounted vertically to the right and left vertical edges of the rotary tool ratcheted back support panel 38. The rotary tool ratcheted support panel 38 is housed within the right slotted column 30 and the left slotted column 32 of the slidable U-shaped support housing 26.

Figure 5A:
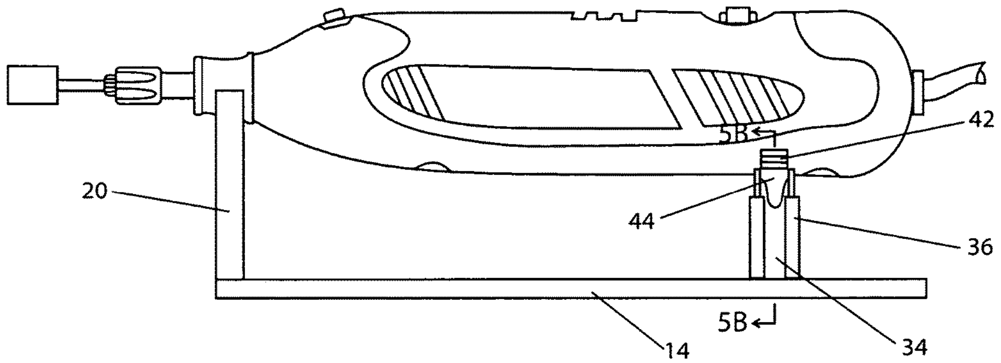
FIG. 5A shows the cradle in side view to depict the horizontal positioning of a rotary tool set into the workbench cradle, supported by the front support panel and the ratcheted back support panel.

FIG. 5A as seen in sectional view demonstrating the slidable U-shaped support housing 26 and the rotary tool ratcheted back support panel 38 housed between the right slotted column 30 and the left slotted column 32 to further demonstrate the cable tie head/pawl mechanism 44 with the pawl tooth 46 interfacing with the cable tie band 42 of the rotary tool ratcheted back support panel 38. A pawl release lever 48 is a component of the mechanism. The rotary tool 50 is seated and secured in the V-notch configuration of the rotary tool ratcheted back support panel 38.

Figure 5B:
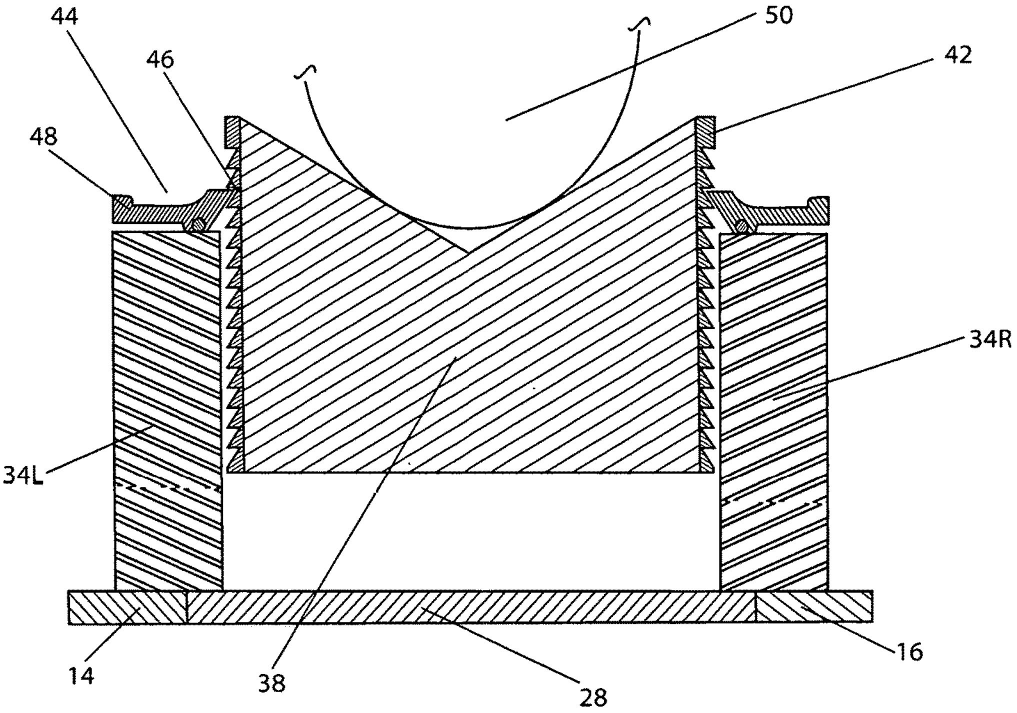
FIG. 5B is a frontal view through the center of the slotted columns of the U-shaped support housing demonstrating the cable tie pawl tooth interfacing with the cable tie band of the ratcheted back support panel. The rotary tool is supported on the panel.

FIG. 5B demonstrates the horizontal positioning of a rotary tool within the workbench cradle with dual support to the rotary tool at the neck or collar and at the mid to distal portion of the tool casing. The rotary tool ratcheted back support panel 38 positioned in the slidable U-shaped support housing 26 is extended up exposing the cable tie band 42 as the rotary tool is leveled.

Operation

The professional craftsman, the amateur craftsman, homeowner or child places the rotary tool workbench cradle, FIG. 1, on a bench top or table top. An accessory is selected to perform the desired task, (cutting, grinding, sanding, routing, engraving, polishing) to be directed to the workpiece. The appropriate accessory is mounted into the collet or chuck of the rotary tool and secured.

The rotary tool with accessory mounted is now lowered into the rotary tool workbench cradle, FIG. 1, simultaneously placing the neck or collar of the tool into the central notch 24 of the rotary tool front support panel 20 and the mid to distal casing of the rotary tool into the central panel notch 40 of the rotary tool ratcheted back support panel 38.

At this point, FIG. 5A, the rotary tool ratcheted back support panel 38 can be elevated to horizontally position the rotary tool, FIG. 5B. The rotary tool will swivel at the neck in the central notch 24 as the mid to back portion of the rotary tool is elevated by the rotary tool ratcheted back support panel 38.

The slidable U-shaped support housing 26 which houses the rotary tool ratcheted back support panel 38 can be moved between the right base member 14 and the left base member 16 of the rectangular base platform 10 to accommodate various rotary tool lengths and casing diameters. In this manner the slidable U-shaped support housing 26 can be positioned to permit utilization of the incremental sliding and ratcheted elevation of the rotary tool ratcheted back support panel 38.

Once the rotary tool has been placed in the rotary tool workbench cradle, FIG. 1, a further, finer, more precision alignment of the rotary tool, particularly the cutting, grinding or sanding surface of the accessory can be achieved by first placing a drill bit in the collet to serve as a leveling bar. A wedge-shaped piece of post card or cardboard is passed vertically along the table top under the exposed length of the drill bit marking the drill bit shaft height with a pencil mark along the slopped end of the card both at the base and at the tip of the drill bit shaft. When both marks are at the same height, the drill bit will be horizontal to the table top. The rotary tool ratcheted back support panel 38 provides for fine, incremental elevation of the ratcheted back support panel to level the drill bit and the accessory to be used. Moreover, the pawl release lever 48 provides the means to lower the rotary tool ratcheted back support panel 38 back to the slidable central base strut 28.

The amateur craftsman and the child, under the guidance of a parent or guardian, can more safely utilize a rotary tool which has been placed into the dual support of the central notch 24 and central panel notch 40 of the rotary tool workbench cradle, FIG. 1, with both hands free to secure the workpiece.

CONCLUSIONS, RAMIFICATIONS, AND SCOPE

One or more aspects of the rotary tool workbench cradle provides a device to horizontally seat a rotating tool with mounted accessories toward the task of cutting, routing, grinding, sanding and polishing a workpiece with the functional, interfacing surface of the accessory parallel to the workbench or table top. Traditionally, workbench vises and drill stand workstations have been utilized to horizontally position and hold a rotary tool, basically with a single support jaw mechanism or clamp. Moreover, drill press workstations generally accommodate only the rotary tools supplied by selective manufacturers.

The rotary tool workbench cradle embodiment provides a dual support system, securing the activated rotary tool with the accessory rotating at a preset speed. The rotary tool is seated in the cradle with the neck or collar positioned in the V-notch of the front panel and the body or housing of the rotary tool positioned in a V-notch configuration of a ratcheted back support panel. The V-notch configuration of the support panels and the slidable feature of the back panel, uniquely provides for a compatibility to seat and cradle rotary tools of multiple shapes and dimensions, supplied by multiple manufacturers. It provides a versatile application to the numerous collar sizes which currently range from 18 mm to 24 mm in diameter, housings ranging in size from 38 mm to 50 mm in diameter and rotary tool lengths ranging from 19 cm to 23.5 cm. Larger rotary tools can be seated in the device. Moreover, the device is potentially accessible to smaller and lighter rotary tools as they are developed, utilizing a Velcro strap across the top of the cradle if necessary to further secure a smaller rotary tool.

The unique feature of the ratcheted back support panel provides for a fine, incremental elevation of the mid to back portion of the rotary tool to readily achieve a horizontal position with accessory alignment parallel to the workbench surface. In this manner, the cutting edge of the tool to be sharpened (chisel, knife, scissors, shears) can be positioned and held on a workbench surface or tool holder to interface with the rotating accessory in parallel configuration, providing for a more precisely sharpened cutting edge.

For the professional craftsman, the homeowner, amateur craftsman and the wood-crafting child, the dual support mechanism of the rotary tool cradle provides for and easily facilitates secure positioning of the rotary tool in a safe and effective manner, freeing up both hands to secure the workpiece. The embodiment particularly facilitates rotary tool utilization by the young adult and child for whom traditional bench vise and drill stand workstation support to the ergonomically shaped rotary tool in a horizontal position is time consuming with a less satisfactory, horizontal stabilization to an actuated rotary tool.

The rotary tool workbench cradle has been reduced to practice. The prototype facilitates a prompt, effective, horizontal seating of a rotary tool in a cost effective device with formidable marketing potential.

The present rotary tool workbench cradle embodiment has been defined and presented as a system to support a rotary tool utilizing a dual support system with a unique ratcheted support panel to elevate and horizontally position rotary tools of multiple sizes and configurations. The description is not intended to limit the scope and application to woodworking, tool sharpening or the polishing of jewelry. The scope, intent and spirit of the embodiment is to provide a means to promptly secure a rotary tool in a defined configuration for the horizontal alignment of accessories to the workbench surface to facilitate a more precise interface application toward the task of cutting, grinding, sanding and polishing the tool or workpiece.

LIST OF REFERENCE NUMERALS

10. rectangular base platform
12. forward base member
14. right base member
16. left base member
18. rear base member
20. rotary tool front support panel
22. central rectangular space
24. central notch
26. slidable U-shaped support housing
28. slidable central base strut
30. right slotted column
32. left slotted column
34. central post
36. side panel
38. rotary tool ratcheted back support panel
40. central panel notch
42. cable tie band
44. cable tie head/pawl mechanism
46. pawl tooth
48. pawl release lever
50. rotary tool The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A rotary tool workbench cradle comprising:

a rectangular base platform of four struts with a forward base member, rear base member, a right base member and a left base member, mounted to leave a central rectangular space;

a rotary tool front support panel mounted at 90 degrees on a top, front surface of said forward base member;

a slidable U-shaped support housing mounted perpendicular to said rectangular base platform, horizontally slidable on a top surface of said right base member and said left base member, said support housing having a left slotted column and a right slotted column, an upper end of said left slotted column having a first pawl element, and an upper end of said right slotted column having a second pawl element;

a rotary tool ratcheted back support panel having a left edge and a right edge, said left and right edges having on their surfaces a plurality of ratchet teeth, said back support panel vertically slidable within said slots of said left and right slotted columns of said support housing, wherein said left edge ratchet teeth engage with said first pawl element, and said right edge ratchet teeth engage with said second pawl element; and, a central base strut disposed within the central rectangular space and slidable along an inner surface of said right base member and said left base member, said support housing mounted on said central base strut.

2. The rotary tool workbench cradle of claim 1 wherein a top front edge of said rotary tool front support panel has a V-shaped notch.

3. The rotary tool workbench cradle of claim 1 wherein said right slotted column and said left sided column of said U-shaped support housing are each comprised of a central post and two side panels to each form a U-shaped slot.

4. The rotary tool workbench cradle of claim 1 wherein said right slotted column is mounted perpendicular to a right end of said central base strut and said left slotted column is mounted perpendicular to a left end of said central base strut.

5. The rotary tool workbench cradle of claim 1 wherein said first and said second pawl are releaseable.

* * * * *